United States Patent [19]
Chastant et al.

[11] 4,130,423
[45] Dec. 19, 1978

[54] PULVERULENT COMPOSITION FOR FORMING PROTECTIVE LAYER ON STEEL MELTS

[75] Inventors: Marc Chastant; Paul-Victor Riboud, both of Metz, France

[73] Assignee: Institut de Recherches de la Siderurgie Francaise (Irsid), Saint-Germain-en-Laye, France

[21] Appl. No.: 783,198

[22] Filed: Mar. 31, 1977

[30] Foreign Application Priority Data

Apr. 5, 1976 [FR] France ............................ 76 09879

[51] Int. Cl.$^2$ ............................................. C22B 9/10
[52] U.S. Cl. ........................................ 75/257; 75/53
[58] Field of Search ..................... 75/53, 94, 58, 11

[56] References Cited

U.S. PATENT DOCUMENTS 3,215,522 11/1965 Kuhlmann ............................. 75/11
3,309,196 3/1967 Kaneko ................................... 75/53

Primary Examiner—Peter D. Rosenberg
Attorney, Agent, or Firm—Michael J. Striker

[57] ABSTRACT

A composition for forming a protective layer or slag at the surface of molten steel in the mold during a continuous casting process. The composition is constituted by a mixture of a natural silicate of low melting point and an elevated contents of alkaline oxides, a basic compound, a flux and pulverulent carbon. The natural silicate is a feldspar, a nepheline or nepheline-syenite. The composition is intended for use in continuous steel casting processes.

11 Claims, 1 Drawing Figure

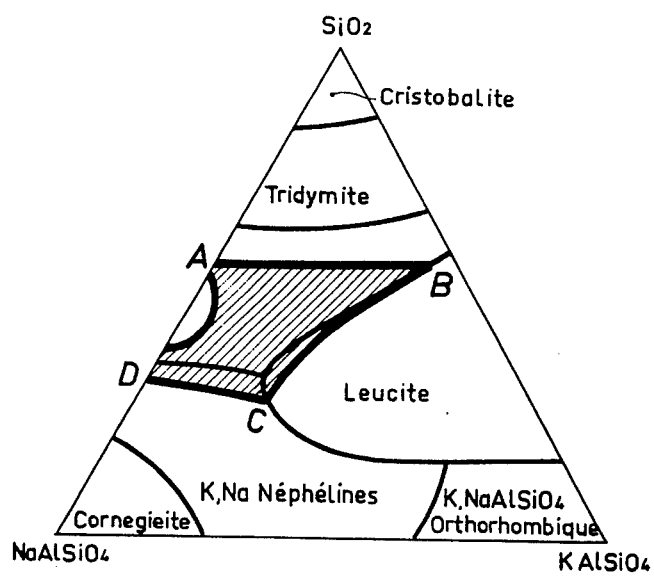

PULVERULENT COMPOSITION FOR FORMING PROTECTIVE LAYER ON STEEL MELTS

BACKGROUND OF THE INVENTION

The present invention concerns fusable compositions of the type which are utilized to cover the surface of liquid steel in the mold during a continuous casting process.

The more recent use in metallurgical operations of installations permitting to produce in continuous processes solid products such as slabs, sheets, etc. starting from liquid steel has brought with it a number of specific problems arising in this type of casting processes. In particular it has been found indispensable to isolate the liquid metal which continuously is present at the surface of the mold from the atmosphere in order to prevent its rapid cooling. To accomplish this protection one has resorted to powders, so-called covering powders of which the melting point is below the temperature of the liquid steel so that they melt and cover the metal with a uniform layer. Apart from its principal object to assure the thermal protection of the metal, these products have soon found other important functions such as the protection of the metal against oxidation, the absorption and dissolving of inclusions which flow up and finally the lubrication between the mold and the skin of the solidified metal which comes in contact with the walls of the mold.

In order to truly accomplish these various functions it is essential that the powder form a liquid homogeneous phase by melting upon contact with the metal. In addition the conditions of the casting process and the nature of the steel require that the liquid thus formed must have specific physical and chemical properties and in consequence it is necessary that the solid product initially present should have an overall composition which is equally perfectly defined.

A particularly satisfactory solution consists in preparing by synthesis a glass which has the desired composition. In the practical application it is for economical reasons preferred in certain cases to rather have powders which are prepared by mixture of the various components. It will be understood that the selection of the components of the mixture is particularly impartant if one wants to obtain a solid product or "pulverulent cover" which fulfills completely the different functions which are required.

The object of the present invention is therefore to provide for a pulverulent product which is well suited for the surface protection of liquid steel.

SUMMARY OF THE INVENTION

This object is accomplished by a product for use in forming a protective slag at the surface of the liquid steel in the mold of a continuous casting process which product is constituted by a mixture of a natural silicate, a basic compound a flux and pulverulent carbon, the silicate belonging to the system $NaAlSiO_4$-$KAlSiO_4$-$SiO_2$. Lithium or calcium may be substituted for the sodium and potassium. The temperature at which the rock commenced to solidify must be below 1100° C. and the contents of sodium and potassium oxides in the rock must be according to the ratio:

$$\{\% Na_2O\} + 0.73 \{\% K_2O\} > 10\%.$$

BRIEF DESCRIPTION OF THE DRAWING

The drawing shows a ternary diagram of the complex $SiO_4$, $NaAlSiO_4$, $KAlSiO_4$ in which the hatched portion signifies the area from which the components of the system $NaAlSiO_4$ - $KAlSiO_4$ - $SiO_2$ should be selected.

DISCUSSION OF THE INVENTION AND OF PREFERRED EMBODIMENTS

The basic compound which permits an adjustment of the composition may be a slag from a blast furnace or a Portland cement.

The fluxes employed can be selected among the sodium carbonate, fluorspar, cryolite, borates and alkali or earth alkali fluorides.

It is likewise possible to form a basic flux from a sodium carbonate or borate which is associated with a fluorinated flux such as the fluorspar, cryolite or the alkaline or earth alkaline fluorides.

The amounts of the different components should be adjusted within the following limits:

| | | |
|---|---|---|
| Natural silicate | 20– 60% | by weight |
| Basic product | 0 – 50% | " |
| Sodium flux | 5 – 25% | " |
| Fluorinated flux | 0 – 25% | " |
| Powdered carbon | 1 – 6% | " |

It will be understood that with this type of composition the purpose is to obtain a melting point of the mixture which is as low as possible and furthermore a viscosity of the liquid phase which is not particularly elevated.

Actually, if we assume that the overall product under consideration will at equilibrium be completely liquid at the temperature T, the mixture of powders must be such that at that temperature the grains of the diverse mineral compositions react rapidly among each other so as to form a homogeneous liquid phase. If this condition is not met the solid grains would continue to be present in suspension in the liquid slag which is formed by melting of the product and they could then be encapsulated in the solidified metal skin. It will also be understood that the reaction between the solid grains causes essentially a diffusion phenomena to occur and therefore constitutes a slow development. Generally, the product which melts first is the sodium flux.

It is therefore important that the other components and in particular the silicate likewise have a low melting point in order to obtain a maximum number of components in a liquid state already at a comparatively low temperature. If at the temperature in question the grains were all solid and the liquid phase formed by reaction between two or even three grains of different composition the development would be particularly slow.

On the other hand since the solidified metal skin has a relatively fine thickness even at the inner end of the mold, it is necessary to diminish as far as possible the risk of rupture during the removal of the solidified steel. To this end it is necessary to obtain a good lubrication between the solidified skin and the mold and a cover slag must therefore be employed which has a viscosity that is not particularly high.

The applicants have tried to obtain a product which simultaneously possesses these two types of characteristics. The mixtures which are normally used as protective cover powder contain a number of products and particularly a material which supplies the silicon.

It will be understood that the liquids which form from the protective covering powder as starting product must contain silicon and that therefore the selection of the principal source of silicon is essential in order to obtain the low melting points. The research undertaken by applicants has shown that it is possible to utilize as silicon source natural silicates such as the alkaline feldspars, the nephelines or the rocks of which the principal components are found in the system Na Al $SiO_4$ - K Al $SiO_4$-$SiO_2$, with possible substitution of lithium and calcium for the sodium or potassium.

The geochemists have actually succeeded to show that it is this system in which the ores or rocks are found which crystallized last from the initial magma lava. These are then, among the abundance of natural silicates, those which have the lowest fusion points.

Besides, the contents of alkaline oxides in the selected ores has a very substantial influence on the viscosity of the obtained liquid phase. The applicants have therefore selected among the natural ores belonging to the indicated system Na Al $SiO_4$ - K Al $SiO_4$ - $SiO_2$, those of which the contents of $Na_2O$ and $K_2O$ are sufficient in order to provide for a satisfactory viscosity of the slag. On this basis it was found that for the necessary contents of these components the ratio between the components should be in accord with the following relationship:

$$\{\% \ Na_2O\} + 0.73 \ \{\% \ K_2O\} > 10\%.$$

For a further explanation of the invention reference is made to the single FIGURE which shows the ternary diagram of the components $SiO_2$, Na Al $SiO_4$, K Al $SiO_4$. In this diagram the segment AB is the borderline of the slag zone which would have an excessively high viscosity. It corresponds to the equation $$(\% \ Na_2O) + 0.73 \ (\% \ K_2O) = 10\%.$$

From this it is readily apparent that the components must be selected from the part of the diagram which is below the borderline AB. Besides, since the compositions must be such that their crystallization temperature is below 1100° C. there is imposed the further borderline BCD. It appears therefore from the drawing that the compositions of the system Na Al $SiO_4$ - K Al $SiO_4$ - $SiO_2$ which makes up the cover slag forming the subject matter of the invention must be selected from the hatched zone inside of the indicated boundaries.

The designations for these ores or rocks vary but generally they are identified as feldspars, nephelines or nepheline syenites. The selection of these natural silicates and in particular of the rocks above identified has the added advantage that these ores or rocks are found in strata which usually have a highly homogeneous composition. This in turn may be considered a certain assurance regarding the regularity of the products. Hence, for all these reasons: the homogeneity of the sources of supply, the low melting points, and the low viscosity, these rocks constitute particularly important sources for the silicon necessary in the protective covering slag.

It should, however, be understood that in view of the complex task which the protective covering has to meet it is necessary to include other additives with the silicates. Thus, in order best to obtain an adjustment of the composition of the mixture it is advisable to add a basic product which for instance may be the slag obtained from a blast furnace. It is also likewise possible in conventional form to incorporate one or several flux compounds selected for instance from the group of fluorspar, cryolite, alkaline or earth alkaline fluorides and borates. Likewise, it is necessary as is also conventional in this type of product to add carbon in pulverulized form.

Experimental tests in which the applicants have engaged have led to a definition of the following desirable proportions of the individual components in the mixtures:

| Natural silicate | 20 – 60% | by weight |
| Portland cement | 0 – 50% | " |
| Sodium flux | 5 – 25% | " |
| Fluorinated flux | 0 – 25% | " |
| Powdered carbon | 1 – 6% | " |

A specific example of interest particularly for mild aluminum killed steel casts is the following mixture:

| Nepheline-syenite | 35% | by weight |
| Portland cement | 30% | " |
| Sodium carbonate | 15% | " |
| Fluorspar | 15% | " |
| Carbon | 5% | " |

In summary, the product which forms the subject matter of this invention is constituted by a mixture which is intended to form a layer or slag when molten in which each component has a relatively low melting point with the exception of course of the carbon of which the part is different, and which in addition also has a viscosity in its liquid phase which is not very high.

This result could be obtained through the use as source of the silicon of the natural silicates which are found among ores or rocks belonging to the same geological family.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Composition for forming a protective layer over molten steel in continuous casting processes, the said composition comprising a mixture of a natural silicate, a flux selected from the group consisting of sodium carbonate, fluorspar ($CaF_2$) cryolite, borates and alkali or earth alkali fluorides and pulverulent carbon, the natural silicate being a rock of the system Na Al $SiO_4$ - K Al $SiO_4$ - $SiO_2$, and the said rock having a solidification temperature below 1100° C. and including oxides of sodium and potassium at a ratio as follows $$\{\% \ Na_2O\} + 0.73 \ \{\% \ K_2O\} \ 10\%.$$

2. The composition of claim 1 in which a basic compound obtained from a blast furnace slag or from Portland cement is added to the composite.

3. The composition of claim 1 in which the natural silicate belongs to the group constituted by feldspar, nephelines, and nepheline-syenites.

4. The composition of claim 1 in which the flux is present in the form of a basic flux and a fluorine-containing flux.

5. The composition of claim 4 in which the basic flux belongs to the group of sodium carbonates and borates.

6. The composition of claim 4 in which the fluorine-contained flux belongs to the group of cryolite, alkaline fluorides and earth alkaline fluorides.

7. The composition of claim 4 which comprises the following

| natural silicate | 20 – 60% | by weight |
|---|---|---|
| Portland cement | 0 – 50% | " |
| sodium flux | 5 – 25% | " |
| a fluorine-containing flux | 0 – 25% | " |
| powdered carbon | 1 – 6% | " |

8. The composition of claim 4 which comprises the following

| nepheline-syenite | 35% by weight |
|---|---|
| Portland cement | 30% " " |
| sodium carbonate | 15% " " |
| fluorspar | 15% " " |
| carbon | 5% " " |

9. The composition of claim 1 in which a lithium silicate partly replaces said natural silicates forming part of said system provided that the total mixture complies with the specification of claim 1.

10. The composition of claim 1 in which a calcium silicate partly replaces said natural silicates forming part of said system provided that the total mixture complies with the specifications of claim 1.

11. The composition of claim 4 wherein the flux is a mixture of sodium carbonate and fluorspar.

* * * * *